United States Patent
Pogrebinsky

(10) Patent No.: US 8,857,538 B1
(45) Date of Patent: Oct. 14, 2014

(54) METHOD FOR DRILLING A BOREHOLE

(76) Inventor: Michael Pogrebinsky, Houston, TX (US)

( * ) Notice: Subject to any disclaimer, the term of this patent is extended or adjusted under 35 U.S.C. 154(b) by 539 days.

(21) Appl. No.: 12/904,120

(22) Filed: Oct. 13, 2010

Related U.S. Application Data

(60) Provisional application No. 61/250,954, filed on Oct. 13, 2009.

(51) Int. Cl.
*E21B 47/00* (2012.01)

(52) U.S. Cl.
USPC ............. 175/41; 175/50; 175/45; 175/62

(58) Field of Classification Search
USPC ............. 175/61, 62, 50, 41, 45; 73/152.14; 250/253, 254, 269
See application file for complete search history.

(56) References Cited

U.S. PATENT DOCUMENTS

| | | | | |
|---|---|---|---|---|
| RE35,386 | E * | 12/1996 | Wu et al. | 175/45 |
| 5,812,068 | A * | 9/1998 | Wisler et al. | 340/855.5 |
| 7,254,486 | B2 * | 8/2007 | Guo | 702/8 |

* cited by examiner

*Primary Examiner* — David Andrews
*Assistant Examiner* — Ronald Runyan
(74) *Attorney, Agent, or Firm* — Nick A Nichols, Jr.

(57) ABSTRACT

In a method for drilling a borehole real time geosteering data, including natural gamma ray data is obtained for a plurality of borehole positions for drilling a borehole along a projected trajectory. A formation layer having a thickness equal to or greater than the natural gamma ray sphere of influence and having a first lithology is identified. Data is processed for subsequent borehole positions. Upon location of the boundary of a formation layer of different lithology within the natural gamma ray sphere of influence, at least two points of the different formation layer boundary are determined by using the inverse problem methods, and an extrapolation ahead of the drill bit of at least two points is made utilizing the boundary to determine whether to change the borehole trajectory.

9 Claims, 3 Drawing Sheets

METHOD FOR DRILLING A BOREHOLE

CROSS-REFERENCE TO RELATED APPLICATION

This application claims the benefit of U.S. Provisional Application Ser. No. 61/250,954, filed Oct. 13, 2009, which application is incorporated herein by reference.

BACKGROUND OF THE INVENTION

The present invention relates generally to drilling a borehole, and more particularly to a method for real time geostreering the drilling of a borehole.

In the search for oil and gas producing formations to meet the ever increasing demand for energy, the oil industry constantly strives to develop techniques to maximize the recovery from oil and gas producing reservoirs. Oftentimes, the recoverable oil and gas in the reservoirs is in thin oil and gas bearing formations or beds, for example, three to twenty feet thick, that requires the drilling of horizontal wells.

Techniques have been developed to steer the drill bit to maintain the borehole within a target formation. For example, various steering techniques use information from offset wells to compare with logging data obtained while drilling the well. A logging while drilling (LWD) tool provides real time borehole measurements while drilling through a formation. The LWD measurements are used to make drill bit trajectory adjustments to maintain the borehole in the target formation. Use of real time information in this manner is generally referred to in the oil industry as geosteering.

SUMMARY

In a method for drilling a borehole in accordance with the present invention natural gamma ray data is obtained for a plurality of borehole positions along a proposed borehole trajectory through a formation having formation layers of different lithologies. The gamma ray data is processed and the inverse problem is solved for the borehole positions. A determination is made whether a boundary between layers having different lithologies are located within the natural gamma ray sphere of influence. The formation boundary ahead of the drill bit is projected by extrapolating two or more points of the boundary. The extrapolated boundary date is used to determine whether to the change the borehole trajectory to reach the target layer.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

When drilling directional and/or horizontal wells (including side tracks), it is desirable that the drill bit is steered to drill and maintain the borehole within the target formation layer. The target layer is often very thin (perhaps three to twenty feet thick) so the drill bit must be guided to form the borehole within a relatively narrow corridor.

Figure 1:
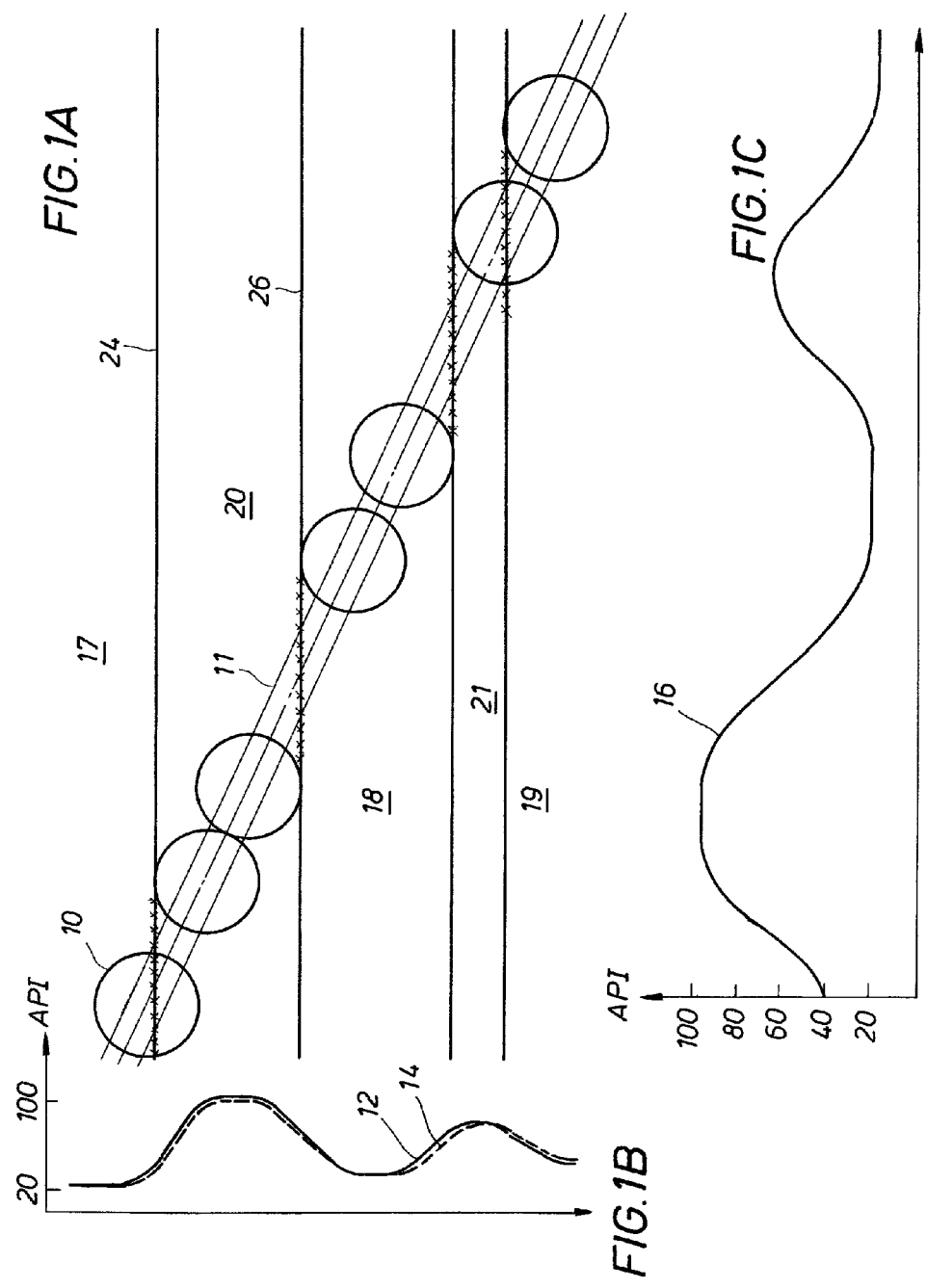
FIG. 1A is a diagram illustrating drilling a borehole through a formation having alternating layers of sand and shale in accordance with the present invention.
FIG. 1B is a vertical graph illustrating observed gamma ray data for the borehole positions shown in FIG. 1A.
FIG. 1C is a horizontal graph illustrating observed gamma ray data for the borehole positions shown in FIG. 1A.

Gamma ray logging is a known logging method that provides lithologic mapping data of the different layers or beds of a formation. Natural gamma measurements have a depth of investigation equal to a sphere with a radius of about two feet, commonly known as the natural gamma ray "sphere of influence." The diagram in FIG. 1A, by way of illustration, depicts a gamma ray sphere of influence 10 at a plurality of positions in the borehole 11. Interpretation of the gamma ray data enables an operator to define boundaries between formations having different lithologies. To the left of FIG. 1A, FIG. 1B illustrates known vertical gamma ray logs of a sidetrack well log 12 and an offset well log 14 that correspond to the formation layers shown in FIG. 1A. Both logs look similar. FIG. 1C illustrates a horizontal log 16 of the formation layers shown in FIG. 1A developed from known data. Depending on the resolution of a gamma ray log, it may be very difficult to determine the true boundaries of the formation layers based on interpretation of the vertical logs 12, 14 and/or the horizontal log 16.

Referring still to FIG. 1A, a formation having alternating layers of sand and shell is illustrated. Sand layers 17, 18 and 19 are separated by shale layers 20 and 21.

Figure 2:
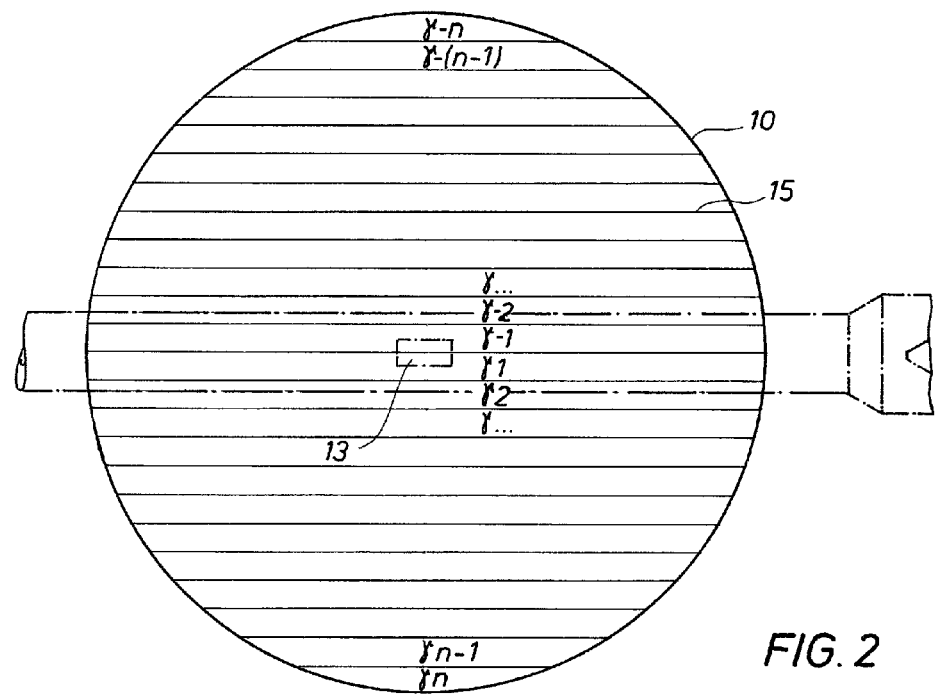
FIG. 2 is a diagram illustrating a sphere of influence of gamma radiation from a gamma ray tool positioned in a borehole.

According to the present invention, an observed value of natural gamma radiation intensity at any borehole position may be described as the cumulative sum of gamma radiation intensity within the gamma ray sphere of influence 10 at a distance r from a gamma ray tool 13. The sphere of influence 10, illustrated in FIG. 2, may be subdivided by two or more planes 15 intersecting the sphere of influence 10 a distance r from the gamma ray tool 13.

It is known that the volume of rock in a formation layer for any point on each plane 11 can be divided into small voxels, each with a volume dV. For example, if the thickness of each voxel is 1 inch, and other dimensions are also equal to one inch, then $dV=1$ inch$^3$. The gamma-radiation intensity $\gamma$ of an arbitrary voxel detected by the gamma ray tool 13 is given by Lapp and Andrews (1972) as:

$$\gamma = \gamma_o e^{-\mu r},$$

where $\gamma_o$, is the gamma-radiation intensity at distance $r=0$, and $\mu$ is the linear absorption coefficient, which combines the effects of photoelectricity, Compton scattering, and pair production.

The absorption coefficient $\mu$ depends on the type and density of the material through which the gamma ray travels and on the energy of the gamma ray. For clastic formations, one value of μ can be assumed for both sandstone and shale (they both have similar densities). For example, a typical value for μ is 13.86 m$^{-1}$ (Geel, 2002).

Referring again to FIGS. 1A, 1B and 1C, collectively, sample vertical gamma ray logs 12 and 14 and horizontal log 16 generated by conventional logging methods are shown to the left and below, respectively, of the alternating sand and shale formation layers illustrated in FIG. 1A. As noted earlier, it is difficult to determine true formation boundaries based on the vertical logs 12, 14 and horizontal log 16 because often times the log resolution is inadequate to determine the true boundaries of thin formations. For example, conventional interpretation of the vertical and horizontal logs shown in FIGS. 1B and 1C would assume that the shale layers 20 and 21 defined by the peaks of the logs 12 and 14 are relatively thin. Likewise, the valleys of the logs indicate that the sand layers 17, 18 and 19 are also relatively thin. However, applying the method of the present invention it is observed that the formation layer 20 defined by the upper boundary 24 and lower boundary 26 is thicker than assumed.

The method of the present invention includes processing directional and natural gamma ray data that is collected as drilling proceeds and solving the inverse problem for each borehole position where directional and natural gamma ray data is collected, starting from a formation layer with known lithology (the thickness of the "reference" layer should be equal to or greater then 4-5 feet). The inverse problem is a known theory used to convert observed measurements or data into information about an object or system. For the present borehole drilling method, the solution to the inverse problem provides information about the formation layer for each borehole position where data is collected. When the borehole extends in a non-vertical direction, two points of the same boundary between formation layers with different lithologies may be mapped. With two points of the boundary between the formation layers, the boundary ahead of the drill bit may be extrapolated. The solution of the inverse problem for the reference layer provides a reference for comparing the accuracy of the solution of the inverse problem at other borehole positions.

Figure 3:
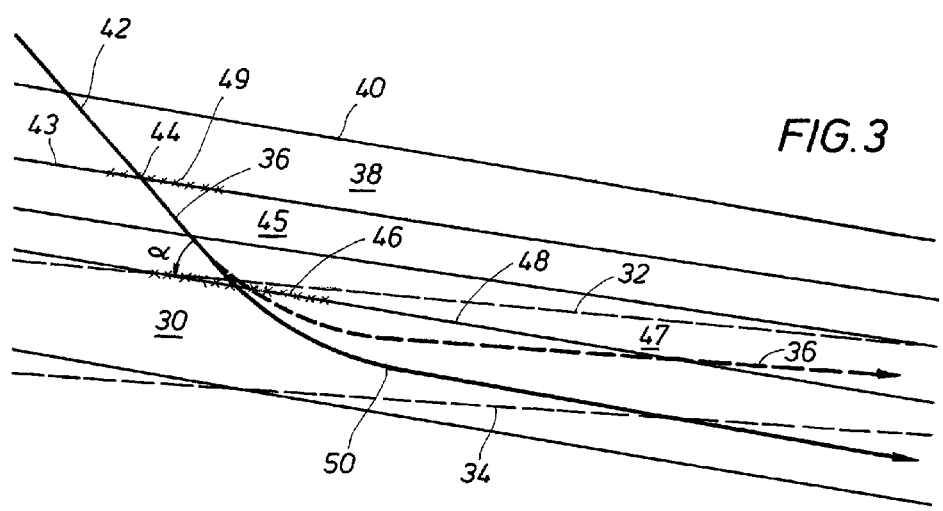
FIG. 3 is a diagram illustrating borehole trajectories calculated using a prior art method and a method in accordance with the present invention.
Figure 4:
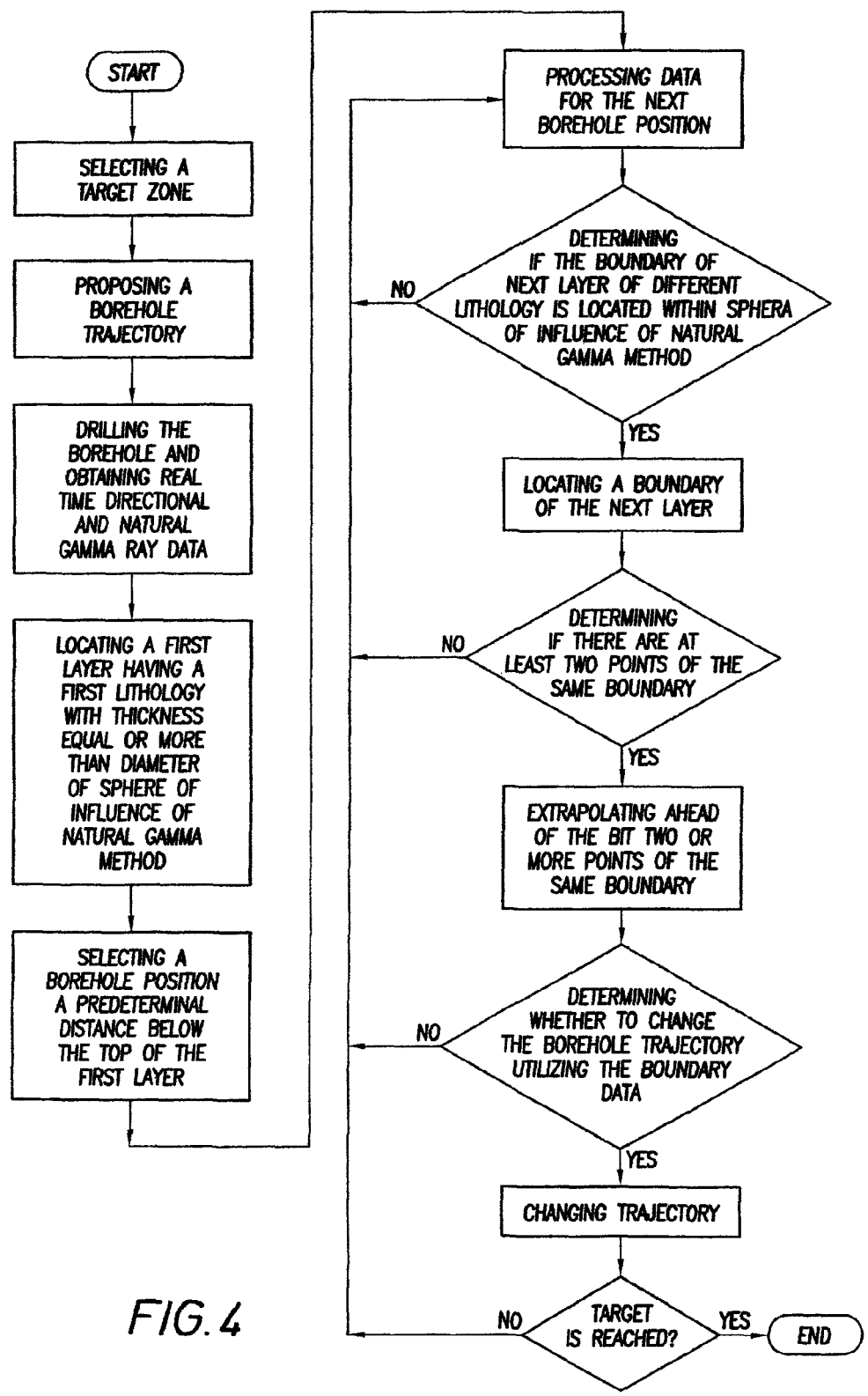
FIG. 4 is a flowchart illustrating a process for making borehole geosteering decisions in accordance with a preferred embodiment of the present invention.

Referring now to FIG. 3, the drilling method in accordance with the present invention will be described in greater detail. For purposes of the following description, a target sand layer or bed 30 is selected. Based on available logging data, the expected upper and lower boundaries of the sand layer 30 are determined and indicated in FIG. 3 by the broken boundary lines 32 and 34, respectively. A proposed borehole drilling trajectory 36 is selected that will form a substantially horizontal borehole through the center of the layer 30 between the upper formation boundary 32 and the lower formation boundary 34. Real time directional and natural gamma ray data is obtained as the borehole is drilled. A first layer 38 (shale) having a first lithology and a thickness that is equal to or greater than the diameter of the sphere of influence of the natural gamma ray method is located. A borehole position 42 a predetermined distance, for example about two feet below the top boundary 40 of the first layer 38, is selected. Directional and natural gamma ray date is processed for borehole position 42. Data is then processed for subsequent borehole positions until the boundary 43 of the next layer 45 (sand) of different lithology is located within the sphere of influence of the natural gamma ray method. If there are at least two points 44 of the same boundary within the sphere of influence, two or more points 49 of the boundary are extrapolated ahead of the drill bit. Upon determining the extrapolation points 49, a decision is made whether to change the borehole trajectory utilizing the boundary data.

Upon reaching the location of the expected upper boundary 32 of the target sand layer 30, extrapolation of the points 46 along the actual top boundary 48 of the target layer 30 indicates a dip in the layer 30. A change in the proposed borehole trajectory 36 is made to compensate for the dip in the target layer 30. Drilling continues on the modified borehole trajectory 50 until a point is reached where another change in borehole trajectory is required. It will be observed that the proposed original borehole trajectory 36 results in drilling the borehole into the shale layer 47 above the sand layer 30.

Referring still to FIG. 3, when the angle between the borehole trajectory 36 and apparent dip of a geological formation becomes less than a few degrees, numerous points on the boundary between formations having different lithologies are mapped. The length of the mapped boundary (L) is equal to or less then 2R tan(90−α). If for example, the angle α equals 2°, L=114 feet. Assuming, for example, that 14 feet of the boundary 48 has been mapped by solving the inverse problem at various points on the boundary 48, 100 feet of the boundary 48 ahead of the drill bit may be extrapolated. The accuracy of the extrapolation is made by comparing the extrapolated boundary position with the actual boundary position determined by solving the inverse problem at borehole data points as drilling proceeds. During actual drilling an operator can make changes in the planned borehole trajectory by extrapolating the formation boundary location ahead of the drill bit. Thus, the present invention provides an operator with the ability to drill the borehole in the target layer 30 and avoid drilling into the shale layer 47 above the layer 30.

While a preferred embodiment of the invention has been shown and described, other and further embodiments of the invention may be devised without departing from the basic scope thereof, and the scope thereof is determined by the claims which follow.

The invention claimed is:

1. A method of drilling a borehole, wherein the drilling tool including a gamma ray tool providing gamma ray data within a natural gamma ray sphere of influence, the method comprising the steps of:
   a) selecting a target formation layer in a formation, wherein the formation includes formation layers having different lithologies;
   b) proposing a borehole trajectory to the target formation layer;
   c) drilling the borehole and obtaining real time directional and natural gamma ray data at multiple borehole positions along the borehole trajectory;
   d) processing the real time directional and natural gamma ray data for each of the borehole positions;
   e) locating a generally horizontally extending boundary of the target formation layer, wherein the boundary is located between the target formation layer and an adjacent formation layer having a different lithology;
   f0 determining whether at least two data points of the boundary of the target formation layer are located within the natural gamma ray sphere of influence;
   g) using the data points to extrapolate the location of the boundary of the target formation layer ahead of the drilling tool; and
   h) adjusting the borehole trajectory based on the the extrapolated location of the boundary of the target formation layer to maintain the borehole within the target formation layer.

2. The method of claim 1, including the step of locating a first formation layer having a first lithology, wherein the thickness of the first formation layer is equal to or greater than the natural gamma ray sphere of influence.

3. The method of claim 2, including the step of selecting a first borehole position below a top boundary of the first formation layer and calculating the distance of the gamma ray tool to the top boundary of the first formation layer.

4. A method of drilling a borehole wherein the drilling tool includes a gamma ray tool providing gamma ray data within a natural gamma ray sphere of influence, the method comprising the steps of:
   a) selecting a target zone in a formation having two or more generally horizontally extending formation zones, wherein the formation zones have different lithologies, and wherein the target zone includes a generally horizontally extending upper boundary;
   b) proposing a borehole trajectory to the target zone;
   c) drilling the borehole along the proposed trajectory, and obtaining and processing directional and natural gamma ray data measured by the drilling tool while drilling the borehole;
   d) locating the upper boundary of the target zone;
   e) determining whether at least two data points of the upper boundary of the target zone are located within the natural gamma ray sphere of influence;
   f0 using the data points to extrapolate the location of the upper boundary of the target zone ahead of the drilling tool;
   determining whether to adjust the borehole trajectory
   h) upon extrapolation of the upper boundary of the target zone to maintain the borehole within the target zone.

5. The method of claim 4, including the step of calculating the distance of the gamma ray tool from a boundary of a reference zone of known lithology.

6. A method of drilling a borehole in a formation having generally horizontally extending formation zones having different lithologies, wherein the drilling tool includes a gamma ray tool providing gamma ray data within a natural gamma ray sphere of influence, the method comprising the steps of:
   a) drilling the borehole along a predetermined borehole trajectory;
   b) obtaining and processing directional and natural gamma ray data while drilling the borehole;
   c) determining a generally horizontally extending boundary of a formation zone of interest, wherein the boundary of the formation zone of interest includes two or more data points within the natural gamma ray sphere of influence;
   d) using the data points to extrapolate the location of the boundary of the formation zone of interest ahead of the drilling tool; and
   e) adjusting the borehole trajectory to maintain the borehole within the formation zone of interest.

7. The method of claim 6, including the step of calculating the distance of the gamma ray tool from a boundary of a reference zone of known lithology.

8. The method of claim 6, including the step of confirming the accuracy of the extrapolating step by calculating the distance from the gamma ray tool of the boundary of the formation zone of interest along the adjusted borehole trajectory.

9. The method of claim 6, wherein the extrapolating step includes the step of calculating the extrapolated length of the boundary of the formation zone of interest ahead of the drilling tool.

\* \* \* \* \*